No. 11,832. Reissued June 26, 1900.
W. S. ARCHER.
APPARATUS FOR CLEANING, COMBING, AND ASSORTING FIBROUS MATERIALS.
(Application filed Nov. 2, 1899.)
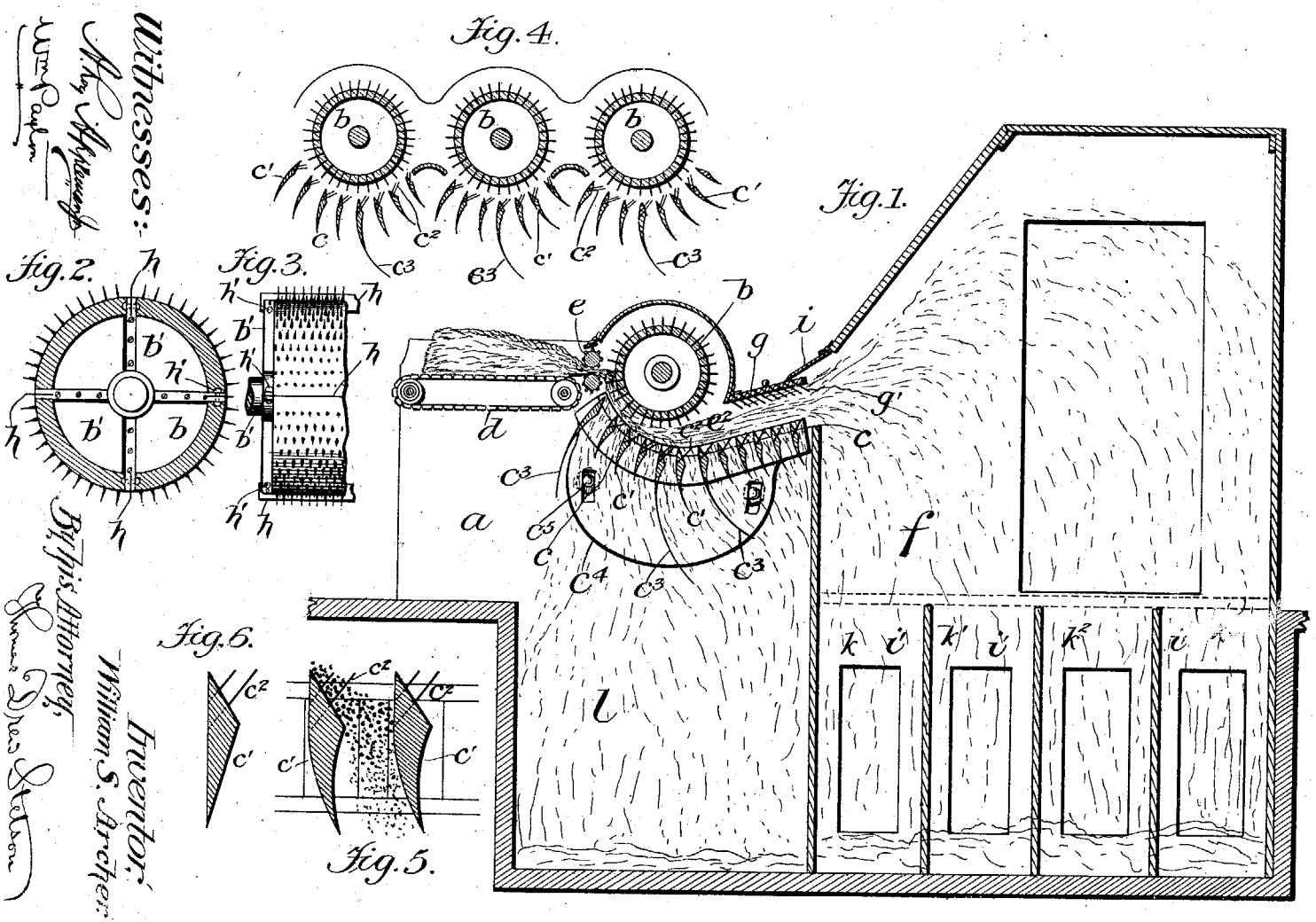
Witnesses:-
A. Roy Appleman
Wm Paylen
Inventor:
William S. Archer
By his Attorney,
Thomas Drew Stetson

UNITED STATES PATENT OFFICE.

WILLIAM SEWARD ARCHER, OF PAWTUCKET, RHODE ISLAND.

APPARATUS FOR CLEANING, COMBING, AND ASSORTING FIBROUS MATERIALS.

SPECIFICATION forming part of Reissued Letters Patent No. 11,832, dated June 26, 1900.

Original No. 622,031, dated March 28, 1899. Application for reissue filed November 2, 1899. Serial No. 735,643.

*To all whom it may concern:*

Be it known that I, WILLIAM SEWARD ARCHER, a citizen of the United States, and a resident of Pawtucket, in the county of Providence and State of Rhode Island, (formerly residing in the city and county of New York, in the State of New York,) have invented a certain new and useful Improvement in Apparatus for Cleaning, Combing, and Assorting Fibrous Materials, (which has been patented in Great Britain, dated August 4, 1894, No. 14,973,) of which the following is a specification.

The object of this invention is principally to provide means whereby the assorting of mineral fibers or asbestos is performed mechanically and whereby the fibers are more efficiently and satisfactorily cleaned and combed without injury or loss of staple, and thus finer and more uniform yarn or goods are produced than heretofore has been the case.

In order that my invention may be more fully understood, I have caused to be appended hereunto drawings, which form a part of this specification.

Figure 1 is a longitudinal section of a complete machine or apparatus for cleaning, combing, and assorting fibrous materials constructed according to my invention. Fig. 2 is an end view, and Fig. 3 a side view, of the end portion of the "picker-roller" on an enlarged scale. The remaining figures show modifications. Fig. 4 is a vertical section showing the arrangement when two or more picker-rollers are employed. Fig. 5 is a section of two of the bars on a larger scale, and Fig. 6 shows another form of the cross-section of the bars.

Similar letters of reference indicate corresponding parts in all the figures where they appear.

In carrying out my invention and referring to the figures generally I employ within a suitable frame or casing $a$ a spiked cylinder $b$, hereinafter termed the "picker-roller," below which is situated a grid $c$, the fibers being fed between the picker-roller $b$ and grid $c$, preferably by a feed-apron $d$ and a pair of feed-rollers $e$, while the cleaned and combed fibers are projected by the picker-roller $b$ into an assorting-chamber $f$ for classification.

The grid $c$ is composed of a suitable number of knife-edged metal bars $c'$, each, except the first, having one or more rows of pins or teeth $c^2$, inclining or pointing obliquely in the direction in which the fibers travel. Between the picker-roller $b$ and the assorting-chamber $f$ a cover $g$ is employed, the under side of which is also furnished with pins or teeth $g'$, pointing obliquely in the direction in which the fibers travel, so as to cause them to be thoroughly cleaned and combed before arrival in the assorting-chamber $f$.

The periphery of the picker-roller $b$ I furnish or form longitudinally with radially-adjustable fan-blades $h$, which serve to create a gentle current of air in the direction of the assorting-chamber $f$ for the purpose of carrying or projecting the cleaned and combed fibers into the same. The fan-blades $h$ being radially adjustable, more or less current of air can be produced, as may be required.

In the present instance the blades $h$ are mounted in arms $b'$, fixed to the ends of the roller $b$ and rendered adjustable therein by means of bolts $h'$, passed through holes formed in the arms $b'$ and the ends of the blades $h$. However, in some cases said fan-blades may be lowered below the periphery of the picker-roller, and thus rendered inoperative, or a picker-roller without fan-blades may be employed.

For the purpose of regulating or arresting the current of air below the grid $c$ as may be required I employ a number of partitions $c^3$, extending from the lower edge of the grid-bars $c'$. The grid-bars $c'$ are rendered adjustable toward each other, and they are adjustable in series toward the picker-roller $b$ by means of bolts $c^5$, inserted in slots in the bracket $c^4$, which holds the bars so that the cleaning, combing, and consequently the assorting action may be varied.

I attach much importance to the curvature of the cross-section of the bars $c'$, as shown in Fig. 1. I prefer about the degree of curvature shown in that figure. I find that it conduces to the reception of the dirt, allowing that alone to fall into the compartment $l$ and allowing all the fiber to travel onward; but my invention may be worked successfully with other degrees of curvature or without any curvature, as I have shown in Fig. 6. The cover $g$ is hinged to the casing $a$, and thereby rendered adjustable toward the grid $c$, so as to narrow or widen the passage through which the material under treatment passes from the picker-roller $b$ to the assorting-chamber $f$, as may be required. A flap $i$, resting on the cover $g$, is hinged to the assorting-chamber $f$ to cover the open space between the same.

The first bar of grid $c$ is without pins or teeth, so as to allow any large hard substance or foreign matter in the fibers operated upon to drop and prevent its striking and damaging the pins or teeth of the other bars.

The lower part of the assorting-chamber $f$ by means of partitions $i'$ is formed into a suitable number of bins $k$ $k'$ $k^2$ $k^3$, adapted to receive the different classes of fibers, $k$ receiving the very coarse, $k'$ the coarse, $k^2$ the medium, and $k^3$ the fine cleaned and combed fibers, while a compartment $l$ below the grid $c$ is adapted to receive the refuse and foreign matter extracted from the fibers. The treated fibers are removed from the assorting-chamber $f$ by means of a door or doors suitably arranged in connection therewith, as shown in Fig. 1.

I may use more than one picker-roller $b$, Fig. 4. I can use any other kind of feeding device without departing from the nature of my invention.

For certain purposes I may render the bins $k$ $k'$, &c., inoperative by placing a cover over the same, as shown in dotted lines in Fig. 1, or the said bins may be dispensed with altogether. I can, if desired in any case, also have teeth $c^2$ in the first bar of grid.

The cleaning, combing, and assorting of mixed mineral fiber is attended with difficulties not incident to the treatment of the ordinary wool and vegetable fiber. In previous methods for so treating asbestos the several operations have been performed in a very imperfect manner and at a great injury to the staple. My improved machine provides means whereby the difficulties above mentioned are obviated; but the short fibers or "nubbings" are readily freed from the long fiber, this latter result being obtained by the particular construction of revolving picker-cylinder, special shape of grid-bars, and specific angle of inclination of the pins, suitable spaces being thereby provided to permit the dirt and short fiber to readily drop therethrough, while the angle of the pins serves for the ready passage of the long fiber over the same to be gently cleaned and combed and then passed to the assorting-bins in the large chamber beyond the picker-roll and grid.

Another difficulty which would ensue in attempting to treat mineral fiber in machines having grid-bars as in prior constructions is the fact that the upper or effective faces of said bars are not sufficiently acute, and therefore the dirt and other foreign matter are not only not properly removed, but the staple sustains a positive injury by reason of its becoming curled. In my machine the presence of the knife-edge bars having the pins inclined in the direction of the travel of the fiber serves to prevent the fiber from becoming torn or injured and insures its being maintained straight, so that it can be finer, cleaner, and more uniform and stronger for subsequent employment. The fact must also be borne in mind that mineral fiber is somewhat adhering in character owing to what may be deemed a "natural stickiness." To secure a proper assorting, therefore, it is desirable that after it has been cleaned and combed it be not permitted to become matted before it is graded or assorted. This I accomplish by locating the assorting-bins in an enlarged chamber immediately receiving the material as it leaves the grid.

I attach importance to the fact that the upper knife-edge formation of each bar presents an upper face which inclines throughout, the top of the bar thus offering no frictional resistance to the descent of the material, which is discharged against the plane or rounding surface of the contiguous bar, which further reduces any interference with the free descent of the material.

I claim as my invention—

1. The combination in a machine for cleaning, combing and assorting fibrous materials, of the inclosed picker-roller $b$ having pins and radially-adjustable fan-blades $h$, toothed grid-bars $c'$, in a curved series below said roller and a large chamber immediately adjacent, substantially as specified.

2. The combination in a machine for cleaning, combing and assorting fibrous materials, of the inclosed picker-roller $b$, having pins and radially-adjustable fan-blades $h$, toothed grid-bars $c'$, in a curved series below the same, and a large chamber immediately adjacent to said roller and series of bars, and provided with assorting-bins $k$, for receiving the different grades of fibrous materials, substantially as herein specified.

3. The combination in a machine for cleaning and combing fibrous materials, of an inclosed picker-roller $b$, having pins and radially-adjustable fan-blades $h$, and toothed grid-bars $c'$, arranged beneath the same in a support adjustable to and from said roller, substantially as herein specified.

4. The combination in a machine for cleaning and combing fibrous materials, of an inclosed picker-roller $b$, having pins and radially-adjustable fan-blades $h$, and grid-bars $c'$, arranged beneath the same in a support adjustable to and from said roller, said bars being provided with pins inclined in the direction of the travel of the fiber, substantially as herein specified.

5. The combination in a machine for cleaning and combing fibrous materials, of an inclosed picker-roller $b$, having pins and radially-adjustable fan-blades $h$, toothed grid-bars $c'$, arranged beneath the same in a support adjustable to and from said roller, and a large chamber immediately adjacent, substantially as herein specified.

6. The combination in a machine for cleaning fibrous materials, of an inclosed picker-roller $b$ and a series of grid-bars $c'$, below the same, each having an upper face forming a top knife-edge and inclined toward the rear surface of the succeeding bar, together with a pin or pins bearing in said upper face and oppositely inclined to extend in the direction in which the fiber travels, and a large chamber immediately adjacent to said roller and series of bars and provided with assorting-bins $k$, for receiving the different grades of fibrous materials, substantially as herein specified.

7. The combination in a machine for cleaning fibrous materials, of an inclosed picker-roller $b$ and series of grid-bars $c'$, beneath the same, each bar having an upper face forming a top knife-edge and inclined toward the rear surface of the succeeding bar, all the bars of the series except one or two at the beginning having a pin or pins bearing in their upper inclined faces and oppositely inclined to extend in the direction in which the fiber travels, and a large chamber adjacent to said roller and bars, and provided with assorting-bins $k$, for receiving the different grades of fibrous materials, substantially as herein specified.

8. The combination in a machine for cleaning fiber of an inclosed picker-roller $b$, having pins and radially-adjustable fan-blades $h$, and a series of grid-bars $c'$, below the same, all the bars of the series except one or two at the beginning having a pin or pins inclined in the direction of the passage of the fiber, the said bar or bars without pins admitting of any hard substance in the fiber being eliminated before the fiber reaches the bars provided with pins, substantially as herein specified.

9. The combination in a machine for cleaning fiber, of an inclosed picker-roller, a series of grid-bars arranged beneath the same in a support adjustable to and from said roller, all of the bars of the series except one or two at the beginning having a pin or pins inclined in the direction of the travel of the fiber, and a large chamber adjacent to said roller and bars, and provided with assorting-bins $k$, substantially as herein specified.

10. A grid for fiber-cleaning machines composed of a number of knife-edged bars $c'$ having severally one or more rows of pins or teeth $c^2$, inclining or pointing obliquely in the direction in which the fibers are to travel, the upper surface of each of said bars being inclined throughout downward from its knife-edge so that there is no surface in advance of said edge to tear or injure the fibers and that the fibers are kept straight by said pins while no frictional resistance is offered to the descent of refuse material over said surface between the pins, substantially as described.

In testimony whereof I have signed my name, this 19th day of October, A. D. 1899, in the presence of two subscribing witnesses.

WILLIAM SEWARD ARCHER.

Witnesses:
WILLIAM PAXTON,
JAMES B. CLAUTICE.